Dec. 22, 1959     M. A. KRUSE     2,918,560
COMBINATION OVEN AND HEATING UNIT
Filed Aug. 10, 1956     2 Sheets-Sheet 1
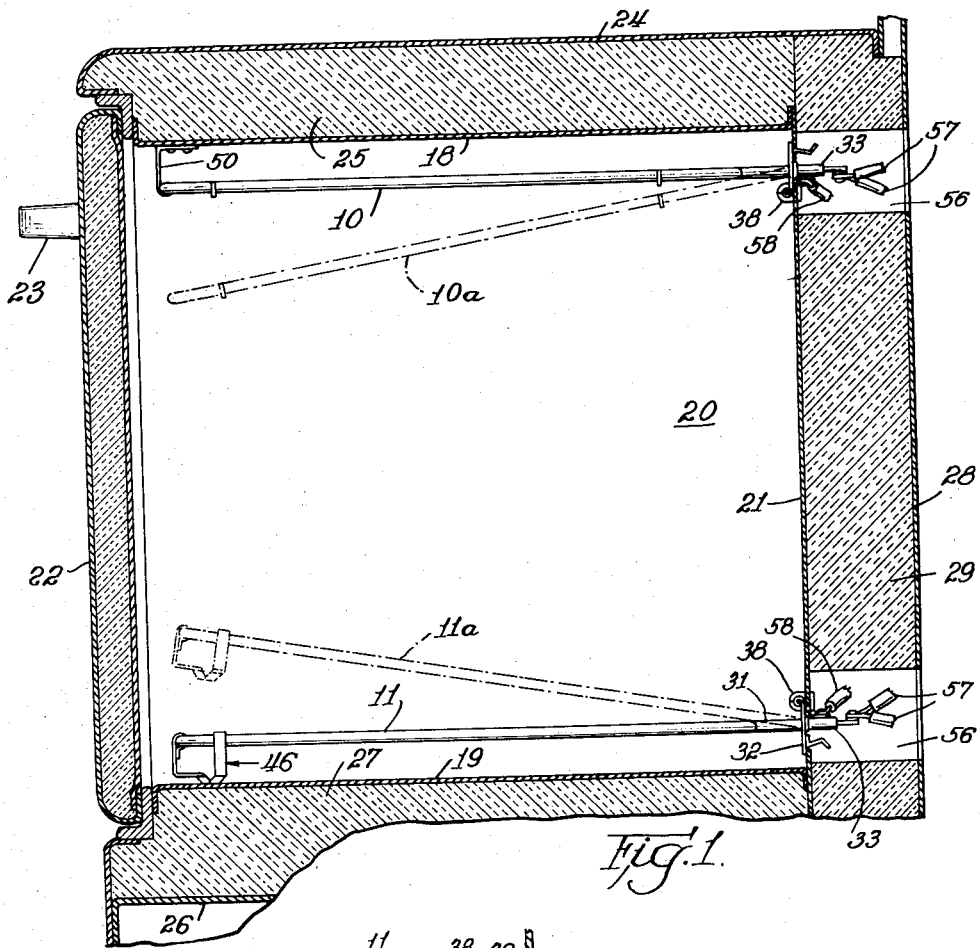
Fig. 1.
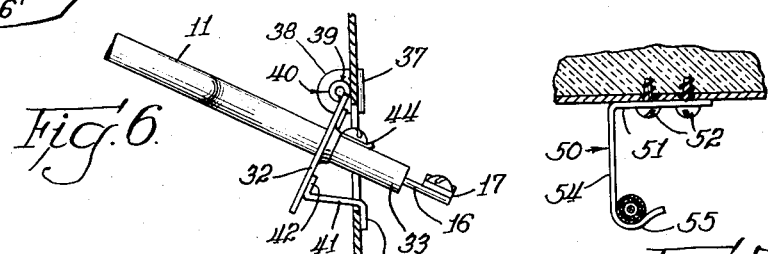
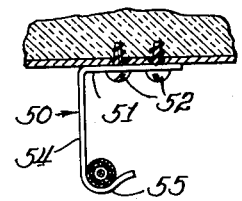
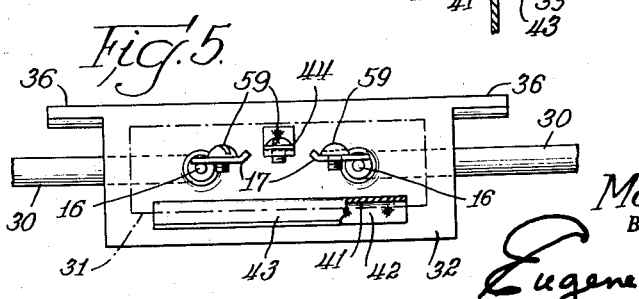
INVENTOR.
Marvin A. Kruse
BY
Eugene M. Giles
Att'y.

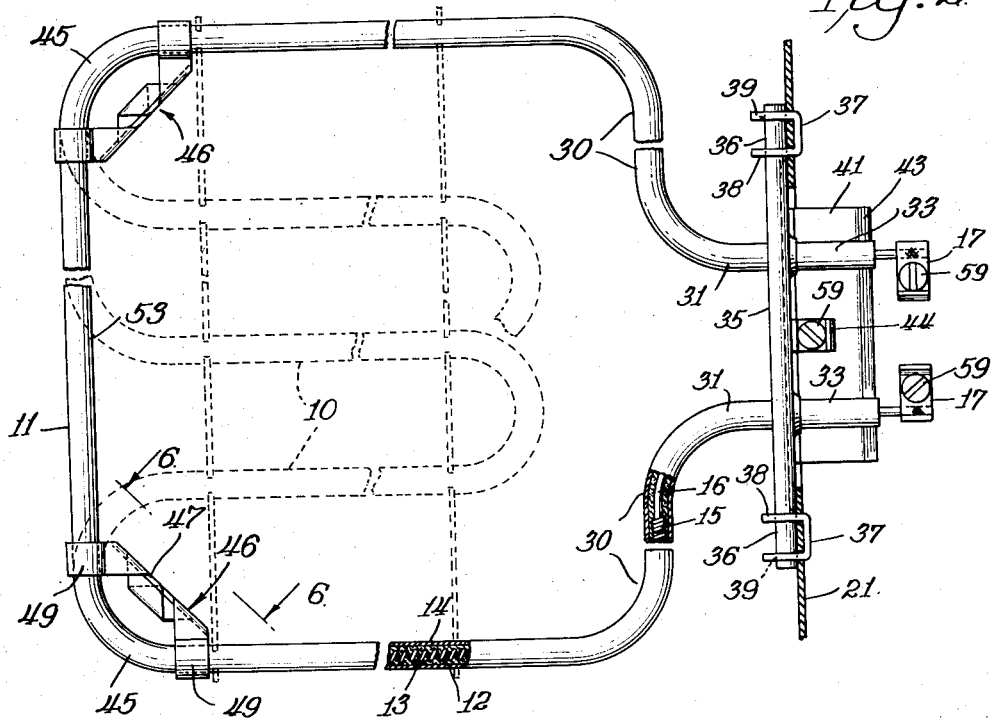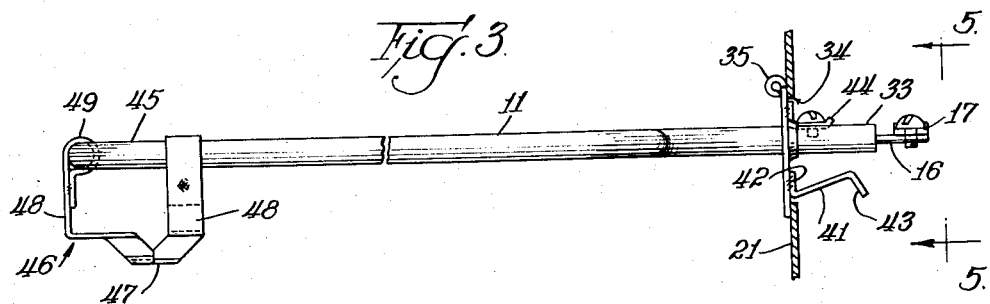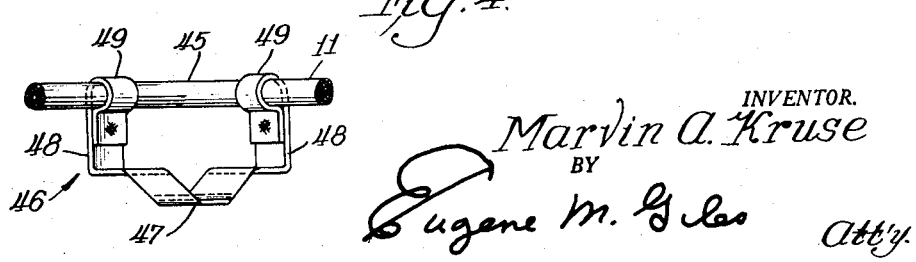

United States Patent Office 2,918,560
Patented Dec. 22, 1959

2,918,560
COMBINATION OVEN AND HEATING UNIT

Marvin A. Kruse, Chicago, Ill., assignor, by mesne assignments, to Ferro Corporation, Cleveland, Ohio, a corporation of Ohio Application August 10, 1956, Serial No. 603,358

2 Claims. (Cl. 219—35)

This invention relates to a combination oven and electric heating unit, and has reference more particularly to facilities for mounting the heating unit in place in the oven and making electrical connections therewith.

Electric ovens of domestic types to which this invention is particularly applicable are commonly provided with a heating unit at the top of the oven and another heating unit at the bottom, for broiling and baking respectively, and as it is important that these heating units be arranged to permit convenient cleaning of the oven and of the heating units, it has been customary to provide the heating units with a separable plug-in connection at the rear so that the heating units are completely removable.

Such complete removal of the heating unit is unnecessary, especially when tubular sheathed heating units are employed, and as the separable plug-in connection materially increases the cost of the installation and also presents difficulty in installation and servicing of the heating units, a less expensive and more convenient mounting of the heating units is greatly desired.

The separable plug-in connection, for example, which is commonly employed, is necessarily of heavy duty type because of the relatively large amount of current supplied therethrough and is composed of two mating parts each with a substantial body of insulating material one of which is secured to the rear of the heating unit and has large terminal prongs projecting therefrom and the other of which is of receptacle type secured to the rear wall of the oven and provided with prong engaging clips therein to receive and hold the prongs of the mating parts on the rear of the heating units.

Moreover the receptacle part is usually located, at least mostly, in the oven rear wall with current supply conductors connected thereto at the back within the rear wall where they are not accessible from the front of the oven, and accordingly it is necessary to remove the rear cover of the range for access to the receptacle part for installation and servicing thereof.

The principal objects of the invention are, to provide simple, convenient and inexpensive facilities for mounting oven heating units and the like; to eliminate the two part separable connection presently employed for mounting such units; to permit frontal access for installing and servicing the heating unit and mounting thereof and direct connection of the current supply connectors to the exposed terminals of the heating unit; and to avoid the expense and inconvenience of presently employed oven heating unit mountings, these and other objects being accomplished as pointed out more particularly hereinafter and as shown in the accompanying drawings in which:

Fig. 1 is a vertical sectional view, from front to rear, of an oven with upper and lower heating units mounted therein in accordance with this invention;

Fig. 2 is a top view, with parts broken away, of the lower heating unit of Fig. 1;

Fig. 3 is a side view of the unit of Fig. 2;

Fig. 4 is a fragmentary view of the unit showing one of the front corner brackets thereof;

Fig. 5 is a rear view of the rear portion of the heating unit showing the mounting and terminal facilities thereof as seen from the right hand side of Fig. 2;

Fig. 6 is a fragmentary side view of the rear end of the lower heating unit of Fig. 1 and the hinge connection thereof with the rear wall of the oven, the heating unit being shown in the up-raised position; and Fig. 7 is a fragmentary view of the latch which may be employed for holding the upper heating unit in the normal up-raised position.

Upper and lower heating units 10 and 11 for broiling and baking respectively are shown mounted in an oven in accordance with the present invention in Fig. 1 and these heating units are of tubular sheathed type comprising a helical resistance 12 embedded in compacted heat conductive electrical insulating material 13 in a metal tube 14, this resistance 12 being connected at its opposite ends within the tube 14, as at 15, to terminal wires 16 which extend outwardly through the respective opposite end portions of the tube and have terminal fittings 17 secured to the projecting ends thereof for connection of current supply conductors thereto.

The oven, which is shown of domestic type, may be of any desired construction built into an electric range or made as an independent unit and has top and bottom walls 18 and 19 respectively, opposite sides 20, only one of the latter being shown herein, and a back wall 21, all secured together to form the oven compartment which is closed at the front by an insulated door 22 to permit access thereto. The door 22 is usually hinged at the bottom and provided with a handle 23 so that it swings downwardly to the open position.

The oven is insulated in the customary manner by provision of other walls or partitions spaced respectively from the oven walls 18, 19, 20 and 21 with a filling of heating insulating material therebetween, these other walls being outer walls or partitions according to the particular application of the oven.

Generally, such ovens are incorporated in electric ranges and, as shown herein, the wall 24 which cooperates with the top wall 18 of the oven to accommodate the insulation 25 therebetween may be the top deck of a range, and the wall 26 which cooperates with the bottom wall 19 of the oven to accommodate the insulation 27 therebetween may be a partition within the range casing.

The range casing is closed at the rear by a back wall or cover 28, which is usually removable, and the oven extends nearly the full distance from front to rear of the range and has the back wall 21 thereof suitably spaced from the range back wall or cover 28 to accommodate the insulation 29 therebetween.

It is to be understood however that the oven construction shown and described is merely illustrative and the present invention does not depend upon the particular construction of the oven except in so far as it may be modified for mounting the heating units therein as hereinafter explained, and certain parts of the oven construction are not shown or described in detail as they are conventional and well known in the art.

The heating units 10 and 11 are preferably of the same generally rectangular loop form, as shown in Fig. 2, the broiling unit 10 being preferably formed, however, with a series of reentrant cross braced loops between the side arms thereof, as indicated by dotted lines in Fig. 2, for better distribution of broiling heat, and they are mounted in the oven in the same manner except that they are reversely hinged and differently supported at their front ends.

Each said unit 10 and 11 has opposite end portions extending inwardly toward one another at the rear as indicated at 30 with end lengths 31 thereof, which contain the terminal wires 16, bent rearwardly in laterally spaced parallel relation and secured by brazing or in any other suitable manner to a hinge plate 32 so that the extreme end portions 33 of the heating unit, hereinafter referred to as the terminal ends thereof, project at the rear of the hinge plate 32 substantially as shown in Figs. 2 and 3.

At the location of the rear end of each heating unit the rear wall 21 of the oven is provided with a horizontal elongated rectangular opening 34 therethrough of substantially less area than the hinge plate 32 as shown in Fig. 5, and the hinge plate 32 is hinged to the rear wall 21 at a place above the top of the opening 34 in the case of the heating unit 11 and below the bottom of the opening 34 in the case of the heating unit 10, so that the plate 32, when swung to the normal vertical position thereof, as shown in Figs. 1 and 3, lies against the back wall 21 and covers and closes the respective opening 34.

Any convenient means may be employed for hinging the plates 32 to the rear wall, as for example by providing the plate with a rolled edge 35 which is continued beyond the opposite ends of the plate to form hinge pintles 36 engaged in bearings provided therefor on the rear wall 21.

These bearings may be openings in ears projecting forwardly from the rear wall 21 and may be provided for example, by clips 37 having forwardly bent ears 38 at the respective opposite ends projecting through slits in the rear wall and having bearing openings 39 immediately in front of the wall 21 to hinge the plate 32 sufficiently close to the back wall to lie thereagainst when the respective heating unit is in the normal horizontal position shown by full lines in Fig. 1.

It is desirable that the ears 38 be adapted to permit installation and removal of the heating unit from the front of the oven, without the necessity of removing the back wall or cover 28 of the range and for this purpose the clips 37 are preferably fastened to the back wall 28 in some manner, as for example by spot welding so that they are not displaceable and the ears may be slit through at the front to the opening 39 thereof as indicated at 40 so that the parts above and below the slit may be bent sufficiently away from the front of the opening 39 to receive the respective pintle 36 therein and then bent back to retain the pintle in the opening.

The hinging of the plate 32 is desirable to permit the respective heating unit 10 or 11 attached thereto to be swung away from its normal horizontal position in the oven to facilitate cleaning of the oven wall near which it is normally positioned and also cleaning of the heating unit itself and it is desirable to provide a stop to limit such swinging movement of the heating unit and for this purpose the plate 32 has a stop plate 41 of a somewhat Z-shaped cross section, as shown in Figs. 3 and 6, secured by a flange 42 along one edge thereof, to the back of the respective plate 32, as for example by spot welding and having a flange 43 along the opposite edge thereof which engages the back wall 21 along the margin of the opening 34 when the heating unit is swung to the desired limit of the permissible swinging movement.

The hinge plate 32 of the lower heating unit 11 is hinged at the top of its respective opening 34, as aforesaid, so that the said heating unit 11 swings upwardly as indicated by broken lines at 11ᵃ in Fig. 1 and the stop 41 thereof is arranged to permit ample upward swinging movement to permit free access under the upraised heating unit 11 to the bottom 19 and lower portions of the sides 20 of the oven and also to the underside of the heating unit itself, whereas the hinge plate 32 of the upper heating unit 10 is hinged at the bottom of its respective opening 34 so that the said upper heating unit 10 swings downwardly as indicated by broken lines 10ᵃ in Fig. 1 and the stop 41 thereof permits ample downward swing of the heating unit 10 to permit free access, above the downwardly swung heating unit 10, to the top wall 18 and the upper portions of the side walls 20 of the oven and also to the upper side of the heating unit 10.

This stop plate 41 may extend nearly the full length of the oven wall opening 34 as shown in Figs. 1 and 5 and is arranged to perform its stopping function positively and with certainty as long as the hinge plate 32 is pivoted in the bearings 39.

The terminal ends 33 of the heating unit project through the opening 34 at all times, so long as the plate 32 is hinged to the rear wall 21 and with ample clearance from the margins of the opening 34 in all positions, and the plate 32 is provided at a place approximately between the terminal ends 33 with a grounding strip 44 permanently secured to the back of the plate 32 as for example by spot welding and this grounding strip is located so as to be sufficiently remote from the margins of the opening 34 to ensure ample clearance in all positions of the heating unit.

It is desirable to provide front end support for the heating units 10 and 11 and for this purpose the heating unit 11 is provided at each of the two front corners 45 thereof with a leg support 46 which projects downwardly therefrom to rest on the bottom 19 of the oven when the heating unit 11 is in horizontal position.

This leg support 46 may be of any convenient construction, but preferably of a strip of sheet metal having a central foot portion 47 which is adapted to rest on the oven bottom and has two upward extending leg portions 48 with permanently closed loops 49 and upper ends engaged respectively around the portions of the heating unit at opposite extremities of the corner bend 45 thereof as indicated in Figs. 2, 3, and 4.

The upper heating unit 10 does not require supporting legs such as the legs 46 of the unit 11, but instead is suspended at its front end from the oven top 18.

Any convenient means may be provided for this purpose which will safely hold the unit 10 in the upraised horizontal position and permit release thereof for swinging downwardly as aforesaid, a preferred form, however, being a spring type latch such, for example as shown at 50 in Fig. 7 which is biased to engage the heating unit and has a mounting leg 51 at the upper end secured by fasteners 52 or in other convenient manner to the oven top wall 18 in a position to engage a front portion of the heating unit 10 substantially midway of the width thereof and having a downwardly extending leg 54 with a hook portion 55 at the lower end adapted to engage underneath the heating unit to hold the latter safely and securely in the upraised position.

Openings 56 are provided in the insulation 29 at the rear of each place of mounting of the heating units 10 and 11 to accommodate the terminal ends 33 and projecting portions of the terminal wires 16 and the terminal fittings 17 of the heating unit and also the ends of current supply conductors 57 which are connected to the terminal fittings 17 and also the end of the ground wire 58 which is connected to the ground strap 44, the terminal fittings 17 and ground strap 44 preferably being provided with terminal screws 59 for securing the respective current supply conductors thereto, and it is to be noted that when the heating unit is mounted in position, the exposed current conducting parts and the connections of the current supply conductors thereto are maintained, in all positions of the heating unit, at such distance from the rear wall 21 and any other conductor parts that they are safely electrically insulated against shorts or current leakage by such distance alone and no special insulating facilities are required therefor.

With the construction above described, the heating units 10 and 11 are installed from the front of the oven, and may be removed and reinstalled in like manner for servicing without the necessity of moving the range from its normal position against a wall and removing the back wall or cover 28 therefrom, and moreover while the connections of the current supply conductors 57 with the terminal fittings 17 and the ground conductor 58 with the group strap 44 may, and perhaps would be made from the rear if the heating units were installed before the range casing is completely assembled and the rear wall or cover installed in place, such rear access for making such current supply and ground wire connections is not essential with the above construction as the current supply conductors and ground wire may be extended through the opening 34, when the heating unit is disconnected at the place of hinging thereof, and connected to or disconnected from the terminal fittings 17 and ground strap from the front of the oven and the heating unit mounting and connections installed and serviced entirely from the front of the oven.

Moreover, the current supply and ground wires are connected directly to the heating unit without any separable connection or extra expense by reason thereof and the need for any servicing and the expense of any servicing that may be required is greatly minimized by reason of the omission of the separable connection heretofore employed.

While I have shown and described my invention in a preferred form, various changes and modifications may be made therein without departing from the principles of the invention, the scope of which is to be determined by the following claims.

What is claimed is:

1. An electric oven structure having oven defining walls providing an oven compartment with an access opening, one of said walls being upright and provided with an aperture, the said opening and aperture having respective large and small doors by which they are closed, and an electric heater in the oven compartment and comprising an elongated stiff tube which contains a heating resistance and is shaped in the form of a flat loop with opposite end portions thereof extending through and secured to said small door and projecting therebeyond through the aperture, the said small door being a plate which is located at the compartment side of said upright wall and has a rolled edge projecting laterally therefrom at the compartment side and provides a tubular reinforcing extending along a lateral margin of the plate and continued beyond the opposite ends of the plate to provide pintles by which the plate is pivotally supported by the said upright wall, the said upright wall having laterally spaced bearings thereon at the opposite ends respectively of the plate with the pintles engaged therein and said bearings being deformable within the compartment to release the pintles therefrom and to lock the pintles therein.

2. An electric oven structure as defined in claim 1 wherein the bearings thereof are apertured ears which project from the upright wall and have opposed bendable portions which are deformable within the compartment to release the pintles from the bearings and to lock the pintles in the bearing.

References Cited in the file of this patent

UNITED STATES PATENTS

| | | |
|---|---|---|
| 1,094,771 | Ball | Apr. 28, 1914 |
| 1,564,086 | MacInnes | Dec. 1, 1925 |
| 1,637,435 | Brown | Aug. 2, 1927 |
| 1,688,853 | Clayton | Oct. 23, 1928 |
| 2,431,607 | Christensen | Nov. 25, 1947 |
| 2,624,908 | Irelan | Jan. 13, 1953 |
| 2,824,944 | Ammerman | Feb. 25, 1958 |
| 2,828,403 | Ammerman | Mar. 25, 1958 |

FOREIGN PATENTS

| | | |
|---|---|---|
| 120,108 | Great Britain | Oct. 31, 1918 |
| 636,432 | Great Britain | Apr. 26, 1950 |